ated Oct. 29, 1968

3,408,221
FINISHED LEATHER AND METHODS OF MAKING THE SAME
Emerson B. Hovey, Wayland, Mass., assignor to United Shoe Machinery Corporation, Boston, Mass., a corporation of New Jersey
No Drawing. Filed Nov. 23, 1964, Ser. No. 413,338
9 Claims. (Cl. 117—55)

ABSTRACT OF THE DISCLOSURE

Leather in which the natural union between the grain layer and corium is reinforced and method of making such leather in which a low viscosity organic solvent solution of thermoplastic polymer resin is applied in small quantities to penetrate through the grain layer and into the corium to leave, on evaporation of the solvent, resinous extensions capable of transmitting stress applied to the grain layer to the corium. Additional resin coatings may be applied to anchor the fine resinous extensions.

---

This invention relates to leather finishing and to finished leather and leather articles and methods of making same.

In the manufacture of leather articles the use of stitching has been replaced by the use of adhesive bonds to hold pieces of leather to other pieces of leather or to other surfaces. Particularly, in the manufacture of shoes a very high proportion of shoes have the outsoles secured to the upper by means of adhesive. To establish a strong adhesive bond it has heretofore been found necessary to "rough" the leather. This process involves abrading away the grain layer.

Natural leather particularly of the kinds ordinarily used in shoemaking such as calfskin, cowhide, etc. includes a strong, relatively coarse fiber main portion or corium and a thin fine fibered layer, i.e. the grain layer, which gives character to the leather. The natural fiber connection between the grain layer and the corium is relatively weak so that merely cementing an outsole to the grain layer of a shoe upper will not provide a bond of adequate strength to hold the outsole in place in ordinary use of a shoe. On the other hand the roughing operation to remove the grain layer and provide a firm base for adhesive attachment is a skilled operation since removal of grain layer in areas which are not part of the adhesive bond constitutes a blemmish on the surface of the shoe and failure to remove enough of the grain layer results in a weak unsatisfactory bond.

It is an object of the present invention to provide a finished leather and method of leather finishing which both reinforces the natural union between the grain layer and corium to enable effective adhesive bonding without roughing and to provide an attractive surface appearance on the leather.

It is a further object of the invention to provide articles in which adhesive bonds are formed to unroughed grain surfaces.

To these ends and in accordance with a feature of the present invention strong flexible resin is introduced into the grain surface of the leather with root or anchor portions extending through the grain layer and into the corium to reinforce the natural union between the grain layer and corium and to distribute stress applied to the grain layer over a significant area of the corium.

The grain layers of tanned leathers vary considerably in the tightness of intermeshing of the component fibers; but in general these grain layers constitute barriers difficult to penetrate by liquids. I have found, however, that low viscosity organic solvent solutions of essentially linear thermoplastic polymer resins are capable of penetrating such layers in significant amounts. Thus, a relatively dilute solution of the resin having a viscosity of from about 2 to about 5 centipoises as determined with the Brookfield Viscometer, No. 1 spindle, at 60 r.p.m. enables significant penetration of resin through the grain layer and into a firm portion of the corium and on evaporation of solvent leaves fine extensions of resin through the grain layer and rooted in the corium. Thereafter, a second resin solution having a viscosity of from 5 to 12 centipoises may be applied and will effect penetration of resin into the grain layer to an extent sufficient to form a resin stratum which anchors the extensions or roots formed by the first treatment and to provide for transmission of stress between the grain layer and the corium to resist rupture. Thereafter, finish coats of resin solutions which may be of higher viscosity are applied to form the desired finish layer at the grain surface of the leather.

In the selection of a suitable resin useful in the present relationship, it is important that the resin have a special combination of physical properties; and the determination of suitable resins may be made by chemists to meet the physical properties. It is important that the resin have a tensile strength of at least 1500 lbs. per square inch and preferably from 2000 to 3000 lbs. per square inch and that it have a hardness of from 50 to 120 preferably from about 80 to about 100 as determined by the Shore Durometer hardness tester on the A–2 scale. For convenience in handling and for resistance under conditions which may be encountered in use, a melting point of from 70° to 100° C. is preferred; and for best cooperation with leather during flexing and to give a good surface appearance on flexing it is desired that the resin be resilient with a good elastic recovery and preferably that it have a modulus of from 200 to 500 lbs. per square inch, preferably 300 to 400 pounds per square inch at 50% elongation.

Resinous materials useful in solution to provide the desired finish may be polyester or copolyester resins obtained by the condensation of one or more aromatic or aliphatic dicarboxylic acid such as isophthalic acid, terephthalic acid, sebacic acid, azelaic acid and succinic acid with one or more glycols such as ethylene glycol, butylene glycol and other 2 to 6 carbon atom alkylene glycols. There may also be used polyamides, and polyesteramides based on such dicarboxylic acids, for example, adipic polyesteramides in which the glycol is 1,6-hexane diol, 1,4-butane diol or ethylene glycol. These resins may be used alone or in admixture with each other to provide the desired physical properties. Also there may be included from 15% to 35% of a thermoplastic substantially linear polyurethane elastomer, e.g. an elastomer such as described in the U.S. patent to Schollenberger 2,871,218 of January 27, 1959 obtained by reaction of a mixture of one mol of a linear hydroxyl terminated polyester of a saturated glycol with a dicarboxylic acid and 1.1 to 3.1 mols of a phenyl diisocyanate in the presence of 0.1 to 2.1 mols of a glycol where the molar amount of polyester and free glycol is equivalent to the molar amount of the diphenyl diisocyanate.

The solutions used for introducing the resin into the leather surface include a volatile organic solvent or mixture of organic solvents for the selected resin. With resins such as the polyesters, copolyesters and isocyanate modified resins it is preferred to use a solvent composition comprising a mixture of a true solvent such as dioxane, dimethylformamide, tetrahydrofurane with volatile organic solvent extender such as a petroleum naphtha, trichloropropane of 2-nitropropane. The use of the extenders appears particularly desirable since solutions in such mixed organic mixtures tend to have lower viscosities for a given solids content. The resin and solvents systems should be so selected with respect to one another that within the viscosity limit of 2 to 5 centipoises there is obtained a solution having a solids content of at least about 2% by weight.

The second solution will ordinarily be of the same or of a similar resin to that used in the first solution and will be compounded to have a solids content of at least about 5% by weight solids and to have a viscosity within the range of 5 to 12 centipoises.

The top coat may also be a solution of the same resin but may if desired be selected to be harder or softer within the range of hardness values noted above and may include pigment and/or dye as dictated by the finish desired.

Application of the various resin solutions may be effected by brushing, swabbing or spraying the respective coating solutions on the grain surface of the leather. Because of the nature of the finish it is ordinarily desirable to treat the surface of the leather before coating by a very light buffing or sanding of the nature and extent used in treating grain surfaces in preparing "corrected grain leather." A substantial quantity of the first resin solution is applied, typically, enough to provide from 0.2 to 0.5 gram of resin solids per square foot. Ordinarily enough of the first resin solution will be applied in a single treatment to supply the desired resin solids, but it is possible to use two or even three applications of this first coating solution to supply the desired solids content. On evaporation of solids the deposited resins provide fine resinous extension through the grain layer with roots in the corium. The second resin solution is ordinarily applied in quantity to provide from about 0.7 to about one gram of resin per square foot. In this case also two or even three applications may be used. The coated leather is dried to form a resin stratum extending into the grain layer and anchoring the fine resinous extensions. The third coating solution is applied in quantity to provide from about 1.5 to 2 grams of resin per square foot and is dried. The final coat or coats are then applied in quantity to provide the desired finish.

In a piece of leather having a grain layer from .005 to .006 inch in thickness it was determined by sectioning the leather parallel to its surface that the leather contained substantial quantity of resin at a depth of .006 inch and significant quantities of resin at a depth of .012 inch. No evidence of resin was found at a depth of .015 from the surface of the grain layer. When the grain was subjected to tests directed to trying to strip the grain layer from the corium it was found that the separation could not be achieved in the usual manner and that on successive cutting and pulling apart of the grain and corium, clumps of fibers lifted up from the body of the corium due to the distribution of separated stress over a wide area by the resin branches extending down from the resin in the grain layer into the corium.

Leather finished in accordance with the present invention may be made into articles of manufacture, particularly shoes, using conventional adhesives but without the roughing step heretofore regarded as important. Such shoemaking may involve cutting shoe parts from the leather, assembling the parts as in a fitting room and lasting or otherwise shaping the upper around a form. At this point the normal procedure would be to rough the sole attaching margins of the shoe bottom to remove the grain layer. However, in the present method this roughing is not carried out.

Sole attaching adhesives useful in securing a sole to the shoe bottom may be known solvent type adhesives such for example, as that shown in the patent to Perkins et al. 2,658,572 comprising an organic solvent solution of butadiene acrylonitrile copolymer rubber together with various resins. With the present finished leather this may be applied to the finished grain surface at the bottom of the shoe upper and to the attaching surface of the outsole, allowed to dry and activated by heat. On pressing together the outsole and the bottom of the shoe upper a strong bond will be formed. The bond will be free from the weakness that would be encountered in carrying out such sole attaching with ordinary finished leather, if roughing were not practiced.

The sole attaching methods disclosed in the U.S. patent application of Rossitto, Ser. No. 121,118, filed June 30, 1961 and entitled Method of Attaching an Outsole and a Shoe Bottom by Using an Adhesive, now U.S. Patent 3,168,754 of Feb. 9, 1965 or that disclosed in the U.S. application of Gordon V. Sprague et al., Ser. No. 356,519 filed Apr. 1, 1964 entitled Methods of Sole Attaching, now U.S. Patent 3,309,724, of Mar. 21, 1967 may be used. These sole attaching methods involve applying molten thermoplastic adhesive to an outsole and thereafter while the adhesive is in heat-softened condition the outsole is pressed against the heated bottom of a shoe upper. With a shoe upper made of the present finished leather and without roughing, a strong bond is formed to the outsole so attached such that pulling off of the outsole requires a high force and effects deep disruption of the leather of the upper to which the sole is attached.

A shoe upper formed of the present finished leather also shows the ability to form a strong bond to an outsole formed by directly molding a thermoplastic resin sole against the bottom of a shoe. For example, in a process in which polyvinyl chloride resin containing about 95% by weight based on the weight of the resin of conventional ester type plasticizers is injection molded onto the bottom of a shoe upper using a molding temperature of 350 to 375° C., it is found that the molded-on sole is strongly held to the upper.

The following examples are given to aid in understanding the invention and it is to be understood that the invention is not restricted to the particular materials, proportions or conditions set forth in the examples.

Example I 200 grams of a polyester resinous material of which the acid components were in the proportions of 3.85 mols of terephthalic acid, 4.9 mols of isophthalic acid and 1.25 mols of sebacic acid condensed with butane diol, were dissolved in a mixed solvent comprising 425 grams of 1,2,3-trichloropropane and 375 grams of 2-nitropropane to form a master solution. The terpolyester had a melting point of about 100° C., a Shore A hardness of 90 to 95, a tensile strength of 2500 lbs. per square inch and a modulus of 250 lbs. per square inch at 50% elongation.

A first coating composition was prepared by diluting 5 grams of the above master solution with 8 grams of 1,2,3-trichloropropane, 7 grams of 2-nitropropane and 20 grams of xylene giving a solution having a viscosity of 5 centipoises as determined by the Brookfield Viscometer using the #1 spindle at 60 r.p.m. This solution was sprayed onto the surface of a side of vegetable retan side leather of which the surface had been smoothed by a light buffing with No. 220 grit paper, in quantity to provide about 0.5 grams of resin solids per square foot. The coating was force air dried for 20 minutes at 150° F.

A second coating solution was made up in which 10 grams of the master solution were diluted with 5.5 grams of 1,2,3-trichloropropane, 4.5 grams of 2-nitropropane and 20 grams of xylene giving a solution having a viscosity of about 9 centipoises. This composition was applied to the dried surface of the coated leather in quantity to provide about 0.7 gram of resin solids per square foot and this coating was dried in similar fashion.

A third coating composition was made up by diluting 20 grams of the master solution with 4 grams of 1,2,3-trichloropropane, 3 grams of 2-nitropropane and 13 grams of xylene giving a solution having a viscosity of about 25 centipoises. This composition was sprayed on the dried coated surface of the leather in amount to provide about 1.6 grams of resin solids per square foot of surface and dried as before.

There was thereafter applied a coating composition comprising the master solution and a black pigment suspension and this composition was sprayed onto the dried coated surface of the leather in quantity to provide about 2.6 grams of solids per square foot of leather surface.

The resulting finished leather was cut and assembled with other components in a shoe upper and the shoe upper was shaped around the last. The shoe upper was then molded in an injection sole molding machine and hot plasticized polyvinyl chloride resin was introduced to fill the space between the bottom of the shoe upper and the mold surface using a molding temperature of about 375° C. When the shoe was removed from the mold and molded-on sole had cooled it was found to be strongly attached to the upper so that stripping the sole involved rupture of material and not a failure of bond between the molded-on soling material and the shoe bottom nor did it involve a simple stripping off of the grain layer from the corium of the leather.

Example II

A resinous terpolyester was prepared by condensation of butane diol with acidic components in the relative proportions of 3.4 mols of terephthalic acid, 5 mols of isophthalic acid and 1.6 mols of sebacic acid. This polyester material had a melting point of about 110° C., a hardness (Shore A) of 80 to 85, a tensile strength of about 2500 lbs. per square inch and a modulus at 50% elongation of from 300 to 400 lbs. per square inch. A master solution was prepared by dissolving 127.5 grams of this resinous material and 32.5 grams of a thermoplastic linear polyester-urethane elastomer (Estane 5703) in a mixed solvent comprising 237.5 grams of dioxane, 237.5 grams of methyl-ethyl-ketone and 165 grams of toluol.

Coating solutions for the first, second and third coats are made up as follows: (first) 12.5 grams of the master solution were diluted with 15 grams of dioxane, 15 grams of MEK and 57.5 grams of xylene giving a viscosity of 4 centipoises as determined by the Brookfield Viscometer using the #1 spindle at 60 r.p.m.; (second) 25 grams of above master solution were diluted with 12 grams of dioxane, 12 grams of MEK and 51 grams of xylene giving a solution having a viscosity of 7 centipoises; (third) 50 grams of the master solution were diluted with 6 grams of dioxane, 6 grams of MEK and 38 grams of xylene giving a solution having a viscosity of 24 centipoises. The solutions were applied as in Example I with drying following each coat in amount to provide 0.2 gram of solids per square foot in the first coat, 0.8 gram of solids per square foot in the second coat and 2.0 grams of solids in the third coat. A finish coat was prepared in which a red pigment was combined with the master solution and sprayed onto the coated surface of the leather in amount to provide 2.5 grams of solids per square foot of surface.

After drying, shoe parts were cut from the leather and assembled with other components to form a shoe upper which was disposed on a last and lasted.

Polyester resin having a melting point of about 120° C. prepared by condensation of 1,4-butane diol with acidic components in the ratio of 4.4 mols of terephthalic acid, 4.4 mols of isophthalic acid and 1.3 mols of azelaic acid. A band of this resin in molten condition at about 245° C. was supplied to attaching margins of a leather outsole. Thereafter the bottom of shoe upper was exposed to radiant heat for about ten seconds to raise its temperature to about 120° to 130° F. and the outsole was pressed against this upper directly after deposition of the adhesive and the assembly placed in a sole attaching press equipped with a concave surface press pad. After fifteen seconds application of pressure the shoe is removed from the press and on examination it was found that the sole was strongly attached to the shoe upper. When the sole was pulled from the shoe upper it was found that deep rupture and tearing of the shoe upper material occurred rather than a simple stripping off of the grain layer from the corium of the leather.

Having thus described my invention, what I claim as new and desire to secure by Letters Patent of the United States is:

1. Natural leather including a grain layer and corium and a synthetic thermoplastic resin finish on said grain layer including from about 0.2 to about 0.5 gram of resin per square foot disposed as fine resinous extensions through said grain layer rooted in said corium and capable of transmitting stress applied to said grain layer to said corium to reinforce the natural union between said grain layer and corium to resist rupture, said resin having a tensile strength of at least 1500 lbs. per square inch, a hardness of from 80 to 100 on the Shore A scale and a modulus of from about 200 lbs. to about 500 lbs. per square inch at 50% elongation.

2. Natural leather including a grain layer and corium and a synthetic thermoplastic resin finish on said grain layer including from about 0.2 to about 0.5 gram of resin per square foot of resin disposed as fine resinous extensions through said grain layer rooted in said corium, a stratum of resin constituting from about 0.6 to about 1 gram per square foot extending into said grain layer and anchoring said fine resinous extensions for transmitting stress applied to said grain layer to said corium to reinforce the natural union between said grain layer and corium to resist rupture, and a finish deposit of resin for visual improvement of the appearance of the leather surface firmly adherent to said grain layer and said stratum of resin, said resin having a tensile strength of at least 1500 lbs. per square inch, a hardness of from 80 to 100 on the Shore A scale and a modulus of from about 200 lbs. to about 500 lbs. per square inch at 50% elongation.

3. Natural leather including a grain layer and corium and a resin finish on said grain layer as defined in claim 2 in which said thermoplastic resin is a thermoplastic linear condensate of at least one dicarboxylic acid and at least one alkylene glycol having from 2 to 6 carbon atoms.

4. Natural leather including a grain layer and corium and a resin finish on said grain layer as defined in claim 2 in which said thermoplastic resin comprises from 85% to 65% by weight of a thermoplastic linear condensate of at least one dicarboxylic acid and at least one alkylene glycol having from 2 to 6 carbon atoms and from about 15% to about 35% by weight of the thermoplastic linear polyurethane product of reacting free glycol in amount equivalent to the active NCO in the condensate of 1.1 to 3.1 mols of a diphenyl diisocyanate with one mol of a hydroxyl terminated polyester of a saturated glycol and a dicarboxylic acid.

5. The method of providing a synthetic thermoplastic resin finish reinforcing the union between a grain layer and corium of natural leather to resist rupture of the union between them comprising the steps of applying to the grain layer a solution in a volatile organic solvent of a synthetic thermoplastic resin, said solution having a viscosity of from about 2 to about 5 centipoises, and being applied in quantity to provide from about 0.2 to about 0.5 gram of resin per square foot to penetrate through the grain layer and into the corium, evaporating solvent from said coating, applying a second solution of a synthetic thermoplastic resin in a volatile organic solvent, said solution having a viscosity of from about 5 to about 12 centipoises and being applied in quantity to penetrate through said grain layer, evaporating solvent from said second coating and applying further coatings of volatile organic solvent resin solution to provide the desired surface deposit of resin for visual improvement of the appearance of the leather surface, said resin having a tensile strength of at least about 1500 lbs. per square inch, a hardness of from 80 to 100 on the Shore A scale and a modulus of from about 200 lbs. to about 500 lbs. per square inch at 50% elongation.

6. The method of providing a synthetic thremoplastic resin finish reinforcing the union between a grain layer and corium of natural leather to resist rupture of the union between them comprising the steps of applying to the grain layer a solution in a volatile organic solvent of a synthetic thermoplastic resin, said solution having a viscosity of from about 2 to about 5 centipoises and being applied in quantity to provide from about 0.2 to about 0.5 gram of resin per square foot to penerate through the grain layer and into the corium, evaporating solvent from said coating, applying a second solution in a volatile organic solvent of a synthetic thermoplastic resin, said solution having a viscosity of from about 5 to about 12 centipoises and being applied in quantity to provide from about 0.6 to about 1 gram of resin per square foot to penetrate through said grain layer, evaporating solvent from said second coating and applying further coatings of volatile organic solvent resin solution to provide the desired surface deposit of resin for visual improvement of the appearance of the leather surface, said resin having a tensile strength of at least about 1500 lbs. per square inch, a hardness of from 80 to 100 on the Shore scale and a modulus of from about 200 lbs. to about 500 lbs. per square inch at 50% elongation.

7. The method of providing a synthetic thermoplastic resin finish reinforcing the union between a grain layer and corium of natural leather to resist rupture of the union between them comprising the steps of buffing the grain layer to an extent comparable to a grain correction treatment, applying to the grain layer a solution in a volatile organic solvent of a synthetic thermoplastic resin, said solution having a solids content of from about 2% to 5% and a viscosity of from about 2 to about 5 centipoises and being applied in quantity to provide from about 0.2 to about 0.5 gram of resin per square foot to penerate through the grain layer and into the corium, evaporating solvent from said coating, applying a second solution in a volatile organic solvent of a synthetic thermoplastic resin, said solution having a solids content of from about 5 to about 10% and a viscosity of from about 5 to about 12 centipoises and being applied in quantity to provide from about 0.6 to about 1 gram of resin per square foot to penetrate through said grain layer, evaporating solvent from said second coating and applying further coatings of volatile organic solvent resin solution to provide the desired surface deposit of resin for visual improvement of the appearance of the leather surface, said resin having a tensile strength of at least about 1500 lbs. per square inch, a hardness of from 80 to 100 on the Shore A scale and a modulus of from about 200 lbs. to about 500 lbs. per square inch at 50% elongation.

8. The method of providing a resin finish reinforcing the union between a grain layer and corium to resist rupture of the union between them as defined in claim 7 in which said thermoplastic resin is a thermoplastic linear condensate of at least one dicarboxylic acid and at least one alkylene glycol having from 2 to 6 carbon atoms.

9. The method of providing a resin finish reinforcing the union between a grain layer and corium to resist rupture of the union between them as defined in claim 7 in which said thermoplastic resin comprises from 85% to 65% by weight of a thermoplastic linear condensate of at least one dicarboxylic acid and at least one alkylene glycol having from 2 to 6 carbon atoms and from about 15% to about 35% by weight of the thermoplastic linear polyurethane product of reacting free glycol in amount equivalent to the active NCO condensate of 1.1 to 3.1 mols of a diphenyl diisocyanate with one mole of a hydroxyl terminated polyester of a saturated glycol and a dicarboxylic acid.

References Cited

UNITED STATES PATENTS

| | | | |
|---|---|---|---|
| 2,763,577 | 9/1956 | Lawler | 117—142 X |
| 2,871,218 | 1/1959 | Schollenberger. | |
| 2,976,182 | 3/1961 | Caldwell et al. | 117—142 X |
| 3,182,041 | 5/1965 | Watkins et al. | 117—142 X |
| 3,245,827 | 4/1966 | Weber | 117—76 |
| 3,269,858 | 8/1966 | Mattei | 117—76 X |
| 3,269,859 | 8/1966 | Mattei | 117—76 X |
| 3,282,726 | 11/1966 | Seligsberger | 117—142 X |

WILLIAM D. MARTIN, *Primary Examiner.*

R. HUSACK, *Assistant Examiner.*